United States Patent
Honda et al.

(10) Patent No.: US 7,630,508 B2
(45) Date of Patent: Dec. 8, 2009

(54) ELECTRO-ACOUSTIC TRANSDUCER AND ELECTRONIC APPARATUS USING IT

(75) Inventors: Kazuki Honda, Mie (JP); Koji Sano, Mie (JP); Tomoyasu Takase, Mie (JP); Takanori Fukuyama, Mie (JP); Mitsutaka Enomoto, Mie (JP); Masahide Sumiyama, Mie (JP)

(73) Assignee: Panasonic Corporation, Osaka (JP)

( * ) Notice: Subject to any disclaimer, the term of this patent is extended or adjusted under 35 U.S.C. 154(b) by 763 days.

(21) Appl. No.: 10/584,967

(22) PCT Filed: Apr. 26, 2005

(86) PCT No.: PCT/JP2005/008382

§ 371 (c)(1),
(2), (4) Date: Jun. 30, 2006

(87) PCT Pub. No.: WO2005/107316

PCT Pub. Date: Nov. 10, 2005

(65) Prior Publication Data

US 2009/0169048 A1 Jul. 2, 2009

(30) Foreign Application Priority Data

Apr. 28, 2004 (JP) ............................ 2004-133116

(51) Int. Cl.
*H04R 25/00* (2006.01)
(52) U.S. Cl. ...................................... 381/386; 381/396
(58) Field of Classification Search ......... 381/386–387, 381/394–396, 398, 423–424, 427, 431, 433
See application file for complete search history.

(56) References Cited

U.S. PATENT DOCUMENTS 4,420,706 A 12/1983 Siebold et al.
4,738,625 A 4/1988 Burton et al.

(Continued)

FOREIGN PATENT DOCUMENTS

EP 1 120 991 A2 8/2001

(Continued)

OTHER PUBLICATIONS

Supplementary European Search Report for Application No. EP 05 73 8748, Jan. 7, 2009, Panasonic Corporation.

(Continued)

*Primary Examiner*—Suhan Ni
(74) *Attorney, Agent, or Firm*—RatnerPrestia

(57) ABSTRACT

An electro-acoustic transducer has a magnetic circuit, a frame, a diaphragm, a voice coil, a terminal, and a stopper. The frame is joined to a magnetic circuit. The diaphragm is joined to a circumferential edge of the frame. The voice coil is joined to the diaphragm and is partially provided at a magnetic gap of the magnetic circuit. The terminal is composed of a metal plate having spring property and conductivity, is partially fixed to the frame, and is electrically connected to the voice coil. The stopper is provided at an outer periphery of the metal plate of the terminal and extends from a main section of the terminal to the frame. The stopper restricts a bending range of the metal plate constituting the terminal to a level equal to or lower than a reversibility limit value of a metal material constituting the terminal.

7 Claims, 7 Drawing Sheets

U.S. PATENT DOCUMENTS

| | | |
|---|---|---|
| 6,553,126 B2 | 4/2003 | Han et al. |
| 6,671,384 B1 | 12/2003 | Klein |
| 6,674,872 B2 | 1/2004 | Fujinami et al. |
| 6,807,282 B2 | 10/2004 | Kaneda et al. |
| 6,860,766 B2 | 3/2005 | Aujla et al. |
| 7,181,040 B2 | 2/2007 | Ohta |
| 7,200,241 B2 | 4/2007 | Fukuyama et al. |
| 7,415,121 B2 | 8/2008 | Mogelin et al. |
| 2001/0009585 A1 | 7/2001 | Masuda et al. |
| 2001/0028303 A1 | 10/2001 | Kuwabara et al. |
| 2001/0053233 A1 | 12/2001 | Fukazawa et al. |
| 2004/0037441 A1 | 2/2004 | Konishi et al. |
| 2005/0152536 A1 | 7/2005 | Caveney |
| 2006/0177092 A1 | 8/2006 | Ohta |
| 2007/0080412 A1 | 4/2007 | Honda et al. |

FOREIGN PATENT DOCUMENTS

| | | |
|---|---|---|
| EP | 1 146 773 A2 | 10/2001 |
| JP | 8-317029 A | 11/1996 |
| JP | 2002-203628 A | 7/2002 |
| JP | 2003-37890 A | 2/2003 |
| JP | 2003-69250 A | 3/2003 |
| WO | WO 00/59263 | 10/2000 |
| WO | WO 2005/107317 A1 | 11/2005 |
| WO | WO 2005/115047 A1 | 12/2005 |
| WO | WO 2006/003821 | 1/2006 |

OTHER PUBLICATIONS

International Search Report for PCT/JP2005/008382, dated Aug. 16, 2005.

ELECTRO-ACOUSTIC TRANSDUCER AND ELECTRONIC APPARATUS USING IT

This application is a U.S. National Phase Application of PCT International Application No. PCT/JP2005/008382.

TECHNICAL FIELD

The present invention relates to an electro-acoustic transducer used in various kinds of audio equipment or information communication apparatus, and an electronic apparatus such as a portable telephone unit and an electronic game machine.

BACKGROUND ART

FIG. 12 is a cross-sectional view illustrating a conventional electro-acoustic transducer that is used as a loudspeaker or a receiver included in an electronic apparatus such as a portable telephone unit. Magnet 1 is disposed between upper plate 2 and yoke 3 to provide an inner magnet-type magnetic circuit. Yoke 3 is press-fit into resin-made frame 6 and integrated by gluing. Diaphragm 7 is fixed to frame 6 at the circumferential edge. Voice coil 8, which is for vibrating diaphragm 7, is attached to diaphragm 7 and is placed in magnetic gap 5 of magnetic circuit 4.

Lead wire of voice coil 8 is soldered with one end of terminal 10. Frame 6 is provided with terminal 10, which is molded partially in the frame. Terminal 10 is bent-up at center section 10A so as not to protrude from the outer boundary of frame 6. Terminal 10 is formed by bending a conductive metal sheet and movable end 10B has a contact with an electric supply section of a system taking advantage of a spring force of metal sheet. Movable end 10B is bent to have a loop-like shape to provide stopper 10C.

FIG. 13 is a cross-sectional view illustrating another conventional electro-acoustic transducer. FIG. 13 has the same structure as that of FIG. 12 except for that stopper 10D protruding to frame 6 is provided in the vicinity of movable end 10B of terminal 10.

In both of the structures shown in FIG. 12 and FIG. 13, stoppers 10B and 10C are provided by machining the vicinity of movable end 10B of terminal 10. Stoppers 10B and 10C both restrict a bending range of terminal 10 so as to prevent a metal sheet constituting terminal 10 from being bent to a level exceeding a reversibility limit value of a metal material constituting terminal 10. This prevents, even when loudspeakers 11A and 11B are strongly pressed while being attached to an apparatus, terminal 10 from being bent to a level exceeding a reversibility limit value. This solves an inconvenience, for example, where terminal 10 is broken while loudspeakers 11A and 11B are attached to an apparatus or terminal 10 has an insufficient spring pressure to cause an unstable contact between terminal 10 and the apparatus. Loudspeakers 11A and 11B are disclosed, for example, in Japanese Patent Unexamined Publication No. 2003-37890.

However, when loudspeakers 11A and 11B have much dimensional margin for attaching loudspeakers 11A and 11B to an apparatus such as a portable telephone unit, stoppers 10C and 10D themselves may be deformed. Furthermore, when an apparatus including loudspeaker 11A or 11B is dropped due to a careless handling, stoppers 10C and 10D may be collapsed by an excessive impactive force. These are caused because, although stoppers 10C and 10D are both made of the same type of metallic terminal and thus have a spring pressure, stoppers 10C and 10D can be deformed permanently when stoppers 10C and 10D receive a force exceeding the reversibility limit value of the spring pressure. When stoppers 10C and 10D are deformed as described above, the reversibility limit value of the spring pressure of the metal terminal of terminal 10 is exceeded. This causes the contact with an electric supply section of the apparatus to be unstable. Thus, poor contact is caused and thus signal transfer is interrupted when the apparatus receives an impact or when the apparatus is vibrated.

The inconveniences as described above are caused not only in the type where terminal 10 includes stopper 10C or 10D but also in the type where frame 5 is integrated with a stopper by resin when frame 6 is subjected to injection molding. In this type, the terminal is exceeded in the reversibility limit value of the spring pressure of the metal terminal when the resin stopper is broken by an impact.

SUMMARY OF THE INVENTION

The electro-acoustic transducer of the present invention has a magnetic circuit, a frame, a diaphragm, a voice coil, a terminal, and a stopper. The frame is joined to a magnetic circuit. The diaphragm is joined to a circumferential edge of the frame. The voice coil is joined to the diaphragm and is partially provided at a magnetic gap of the magnetic circuit. The terminal is composed of a metal plate having spring property and conductivity, is partially fixed to the frame, and is electrically connected to the voice coil. The stopper is provided at least at a part of at an outer periphery of the metal plate of the terminal and extends from a main section of the terminal in a direction substantially perpendicular to the main section of the terminal. The stopper restricts a bending range of the metal plate constituting the terminal to a level equal to or lower than a reversibility limit value of a metal material constituting the terminal. This structure allows the stopper to support the terminal so as to have a substantial right angle to deformation of the terminal. This strengthened stopper minimizes deformation of the stopper itself. This eliminates inconveniences such as the one in which a loudspeaker needs a large dimensional margin in order to attach the loudspeaker to an apparatus and the one in which an electronic apparatus such as a portable telephone unit is dropped due to a careless handling to cause an excessive impactive force to the terminal and thus the stopper is deformed or collapsed.

DETAILED DESCRIPTION OF PREFERRED EMBODIMENTS

Figure 1:
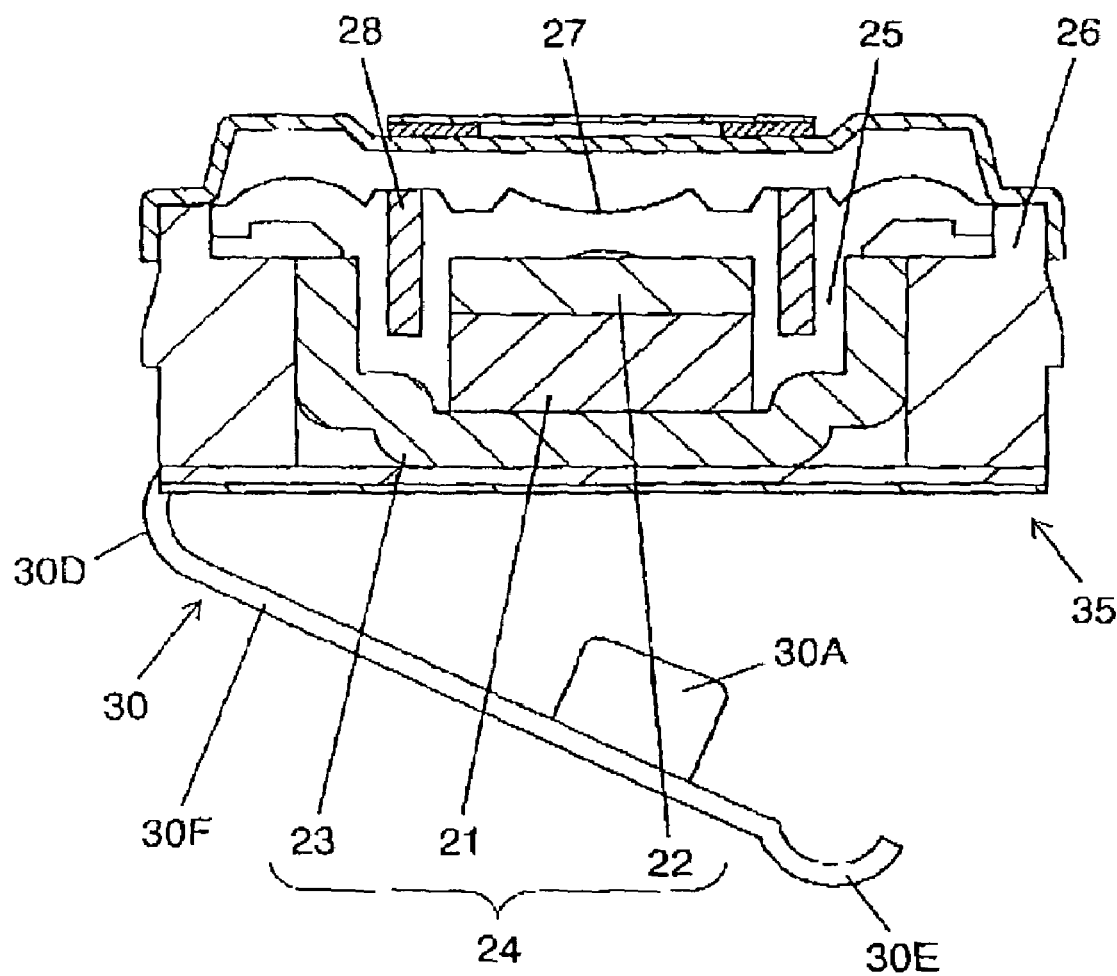
FIG. 1 is a cross-sectional view illustrating a loudspeaker according to an exemplary embodiment of the present invention.
Figure 2:
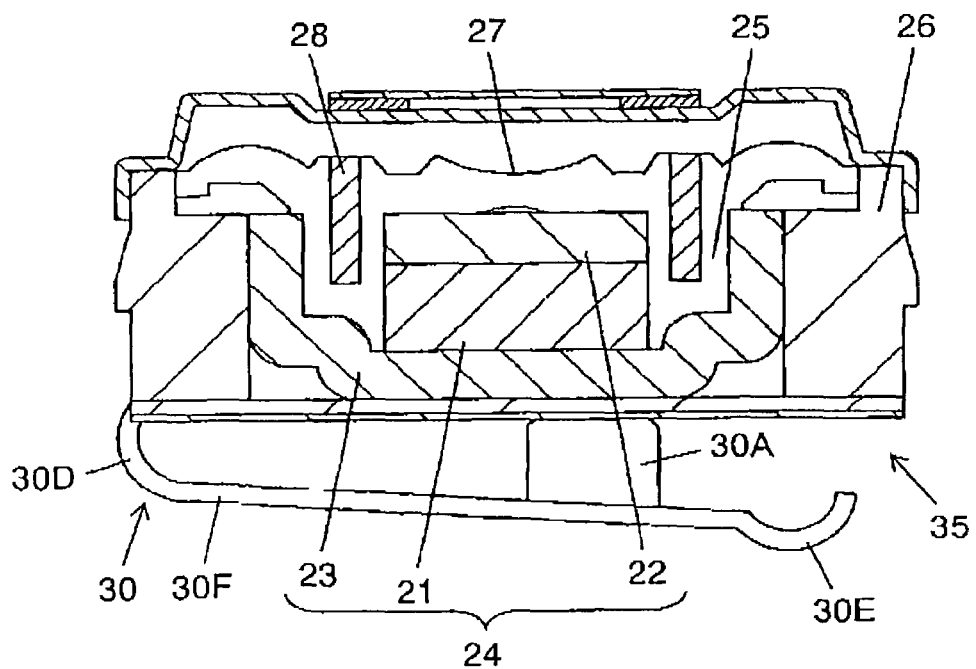
FIG. 2 is a cross-sectional view illustrating the loudspeaker shown in FIG. 1 where a terminal is bent.
Figure 3:
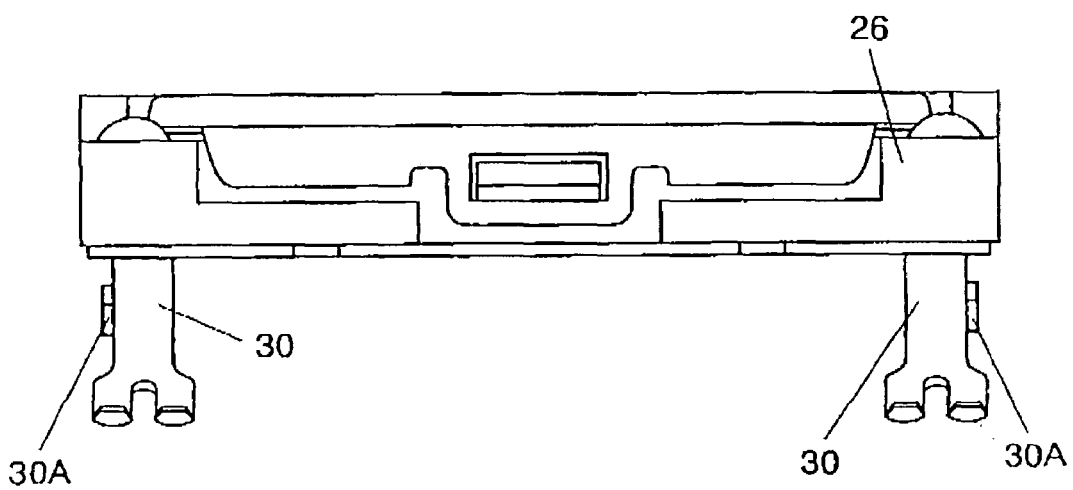
FIG. 3 is a side view illustrating the loudspeaker according to the exemplary embodiment of the present invention.

FIGS. 1 and 2 are cross-sectional views illustrating a loudspeaker in an exemplary embodiment of the present invention. FIG. 1 shows a status where the terminal is released. FIG. 2 shows a status where the terminal is bent to reach a bottom dead point. FIG. 3 is a side view illustrating the loudspeaker. In this embodiment, the loudspeaker has an exemplary outer shape suitable for a rectangular type slim loudspeaker. However, this invention is not limited to this.

Magnet 21 is sandwiched by upper plate 22 and yoke 23 to provide inner magnet-type magnetic circuit 24. Yoke 23 partially constitutes magnetic circuit 24 and is press-fit into resin-made frame 26 and glued to resin-made frame 26. Diaphragm 27 is connected (glued) to frame 26 at the circumferential edge. Voice coil 28 is for driving diaphragm 27 and is joined to diaphragm 27 and is partially provided in magnetic gap 25 of magnetic circuit 24.

Voice coil 28 has a lead wire that is electrically connected to one end of terminal 30 by soldering. Terminal 30 is partially buried in frame 26 and is fixed. Terminal 30 is bent at center section 30D so that terminal 30 is prevented from protruding from an outer dimension of frame 26. Terminal 30 is formed by bending one sheet-like metal plate having spring property and conductivity. The spring pressure of this metal plate is used to allow contact point 30E to have a contact with an electric supply section of a system. Terminal 30 is composed of a metal plate that is made of, for example, phosphor bronze, alloy of copper and titanium or the like so that conductivity and spring property can be both established. In addition to the respective single materials as described above, contact point 30E may be made of a clad material, in which the contact 30 side may be made of a material with superior conductivity such as copper or be plated with gold and the opposite side may use a spring steel or titanium having a strong spring property.

Stopper 30A is provided by bending at least a part of the outer periphery of the sheet-like metal plate of terminal 30 to have a substantially right angle. Specifically, stopper 30A is provided at the outer periphery of terminal 30 and extends from main section 30F of terminal 30 to frame 26. Stopper 30A preferably extends from main section 30F in a direction substantially perpendicular to main section 30F. Stopper 30A restricts a bending range of the metal plate constituting terminal 30 to a level equal to or lower than a reversibility limit value of a metal material constituting the terminal. This limit value is represented by, for example, a bending angle of the metal plate, the shape of a bent portion, an applied load, namely strength or number of repetition of stress.

This structure allows terminal 30 to be bent to a certain level so that an electric supply section of an apparatus is maintained while being applied with an appropriate spring pressure when loudspeaker 35 as an electro-acoustic transducer is attached to the apparatus. Even when loudspeaker 35 is attached by being strongly pushed, stopper 30A is abutted with loudspeaker 35. As a result, terminal 30 is not deformed anymore.

Furthermore, even when an electronic apparatus such as a portable telephone unit is dropped due to a careless handling to apply an excessive impactive force to terminal 30, stopper 30A is prevented from being deformed or collapsed. This is enabled by stopper 30A extending from main section 30F of terminal 30 constituted with a metal plate to frame 26. Stopper 30A does not have a space in a direction along which stopper 30A is raised and thus is difficult to be deformed. This prevents the terminal 30 from being deformed to exceed reversibility limit value of the spring pressure of the metal plate constituting the terminal 30 and thus terminal 30 is prevented from having a reduced spring pressure. It is particularly preferable that stopper 30A is formed by being bent to have a right angle. The reason is that this structure allows a force applied to stopper 30A to be in the same direction as that along which stopper 30A is raised.

Thus, terminal 30 can always maintain a strong spring pressure. This provides a stable contact with an electric supply section of the apparatus. Furthermore, even when the apparatus receives an impact or is vibrated, poor contact is prevented. This provides an improved reliability to an electronic apparatus such as a portable telephone unit.

It is noted that, when terminal 30 is bent to cause stopper 30A to be abutted with frame 26 as shown in FIG. 2, a contact between stopper 30A and frame 26 is preferably not a point contact but a face contact. As a result, the entirety of stopper 30A can receive a load and thus is further suppressed from being deformed.

Next, a preferable structure of the periphery of stopper 30A in this embodiment will be described with reference to FIG. 4 to FIG. 9. FIG. 4 to FIG. 9 are a side view illustrating the structure of the periphery of stopper 30A of a loudspeaker in the exemplary embodiment of the present invention.

Figure 4:
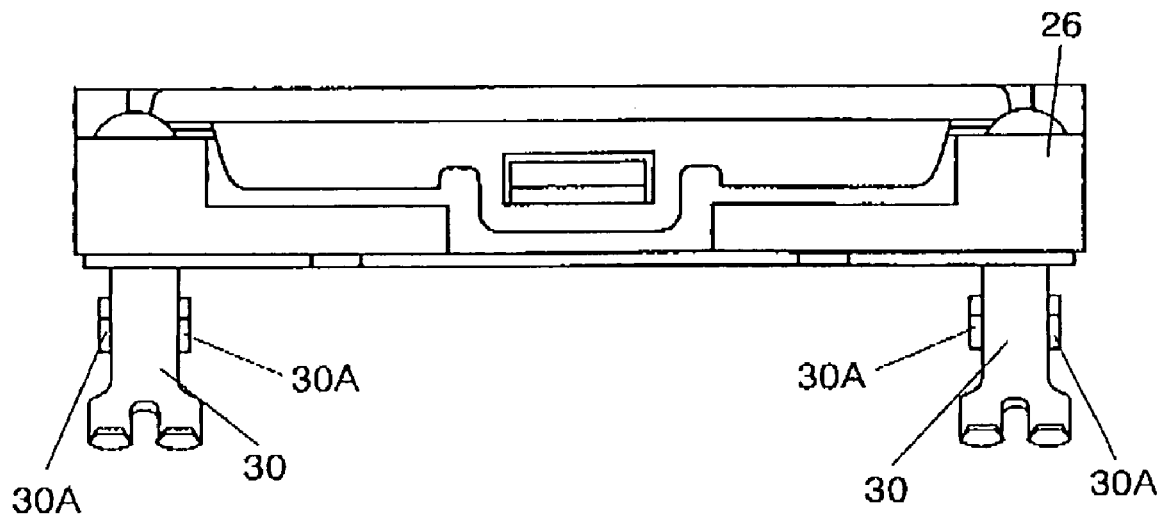
FIG. 4 is a side view illustrating another loudspeaker according to the exemplary embodiment of the present invention.

FIG. 4 has the same structure as those of FIG. 1 and FIG. 3 except for that stoppers 30A are provided at two positions in one terminal 30. In this structure, each terminal 30 is supported by two stoppers 30A. Thus, stoppers 30A are further strengthened. Another configuration also may be used in which stoppers 30A are provided at three or more positions of one terminal 30.

Figure 5:
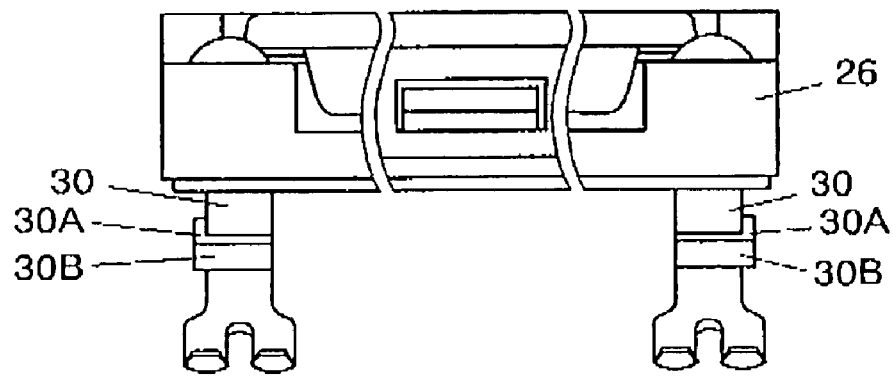
FIG. 5 is a side view of a main part illustrating still another loudspeaker according to the exemplary embodiment of the present invention.

The structure shown in FIG. 5 includes, in addition to stopper 30A, reinforced section 30B that is formed by bending stopper 30A so that reinforced section 30B has a further substantially right angle to stopper 30A. Specifically, the reinforced section 30B extends along a direction substantially perpendicular to at least a part of stopper 30A. Except for this structure, FIG. 5 has the same structure as those of FIG. 1 to FIG. 3.

In this structure, stopper 30A supports terminal 30 by having a substantially right angle to deformation of terminal 30. Furthermore, reinforced section 30B reinforces stopper 30A. In this structure, reinforced section 30B is abutted with frame 26 in an area that is larger than that of the structure of FIG. 3. Thus, deformation of stopper 30A itself is minimized. Stopper 30A is further strengthened as described above and thus is suppressed from being deformed.

Figure 6:
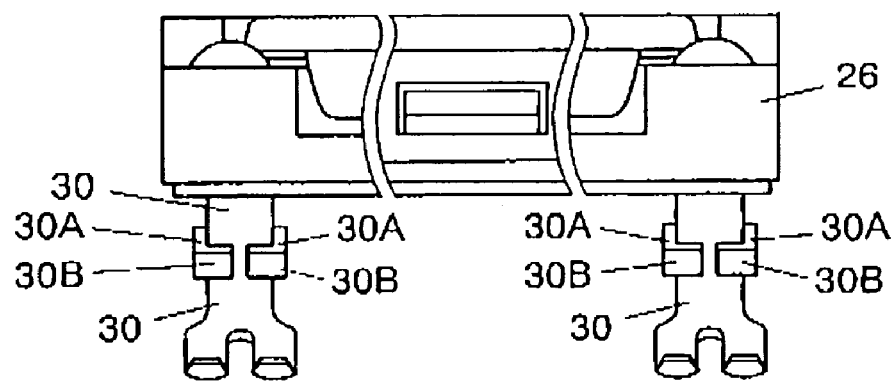
FIG. 6 is a side view of a main part illustrating still yet another loudspeaker according to the exemplary embodiment of the present invention.

FIG. 6 has the same structure as those of FIG. 1 to FIG. 3 except for that stoppers 30A are provided at two positions in one terminal 30 and reinforced section 30B is provided in each stopper 30A. Specifically, the structure shown in FIG. 6 is obtained by combining the structure shown FIG. 4 with the structure shown FIG. 5. Thus, the stopper 30A is further strengthened and thus is suppressed from being deformed.

Figure 7:
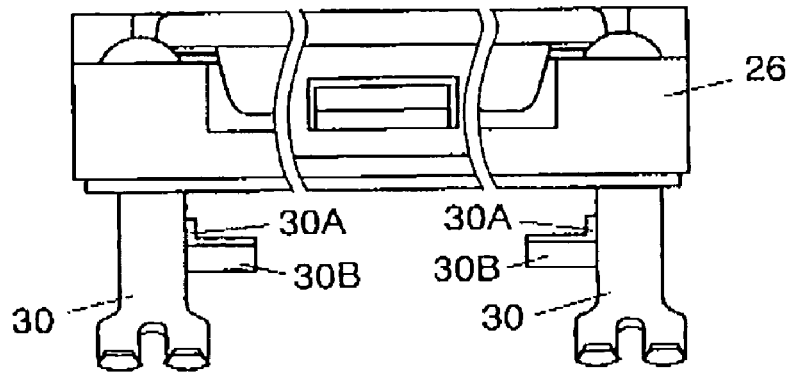
FIG. 7 is a side view of a main part illustrating another loudspeaker according to the exemplary embodiment of the present invention.

FIG. 7 has the same structure as those of FIG. 1 to FIG. 3 except for that stoppers 30A are provided at inner sides of terminal 30 and reinforced sections 30B are provided from stopper 30A to an inner side. This structure also provides the same effect as that of the structure shown in FIG. 5.

Figure 8:
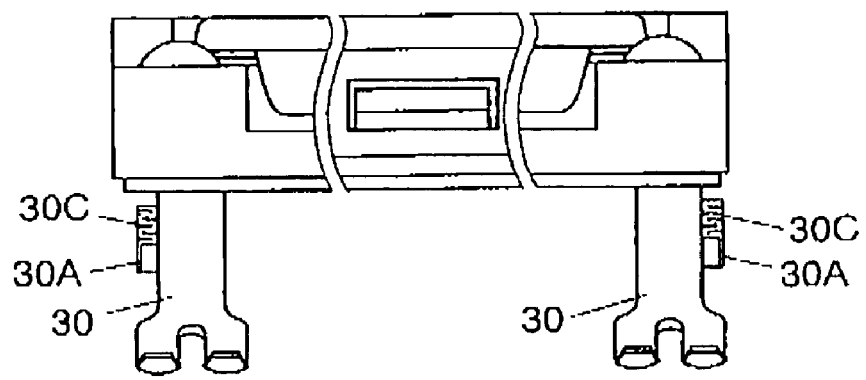
FIG. 8 is a side view of a main part illustrating still another loudspeaker according to the exemplary embodiment of the present invention.

FIG. 8 has the same structure as those of FIG. 1 to FIG. 3 except for that stopper 30A includes reinforcing rib 30C. By an effect by reinforcing rib 30C for reinforcing stopper 30A, stopper 30A is suppressed from being deformed even when stopper 30A receives an external force.

Figure 9:
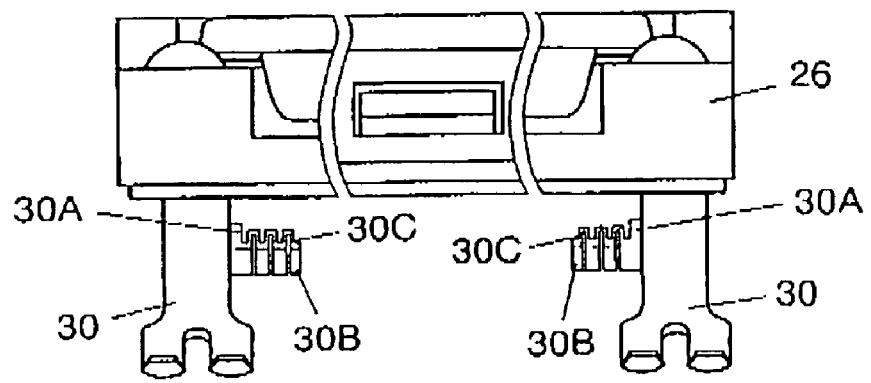
FIG. 9 is a side view of a main part illustrating still yet another loudspeaker according to the exemplary embodiment of the present invention.

FIG. 9 has the same structure as that of FIG. 7 except for that reinforced section 30B includes reinforcing rib 30C. By an effect by reinforcing rib 30C for reinforcing stopper 30A, deformation of stopper 30A is minimized even when stopper 30A receives an external force. Thus, stopper 30A is further strengthened. It is noted that both of stopper 30A and reinforced section 30B also may include reinforcing ribs 30C.

In any of the structures of FIG. 1 to FIG. 9, stopper 30A is provided at a side edge next to a side edge that is at a side section of terminal 30 and at which contact point 30E is provided. In addition to this, another configuration also may be used where stopper 30A is provided by extending an end section of contact point 30E to frame 26. As described above, stopper 30A may be provided at the outer periphery of terminal 30.

Figure 10:
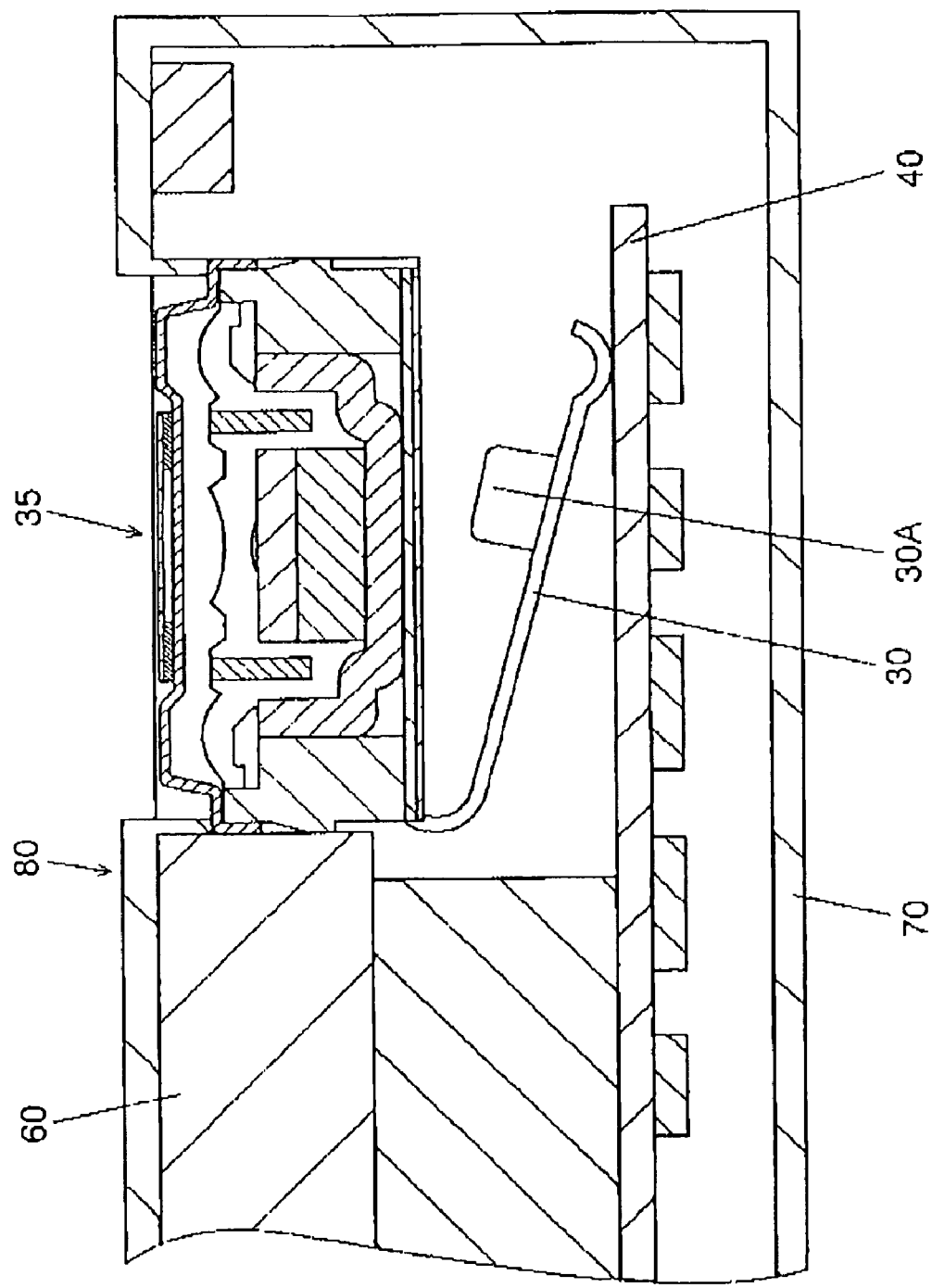
FIG. 10 is a cross-sectional view of a main part illustrating an electronic apparatus according to the exemplary embodiment of the present invention.
Figure 11:
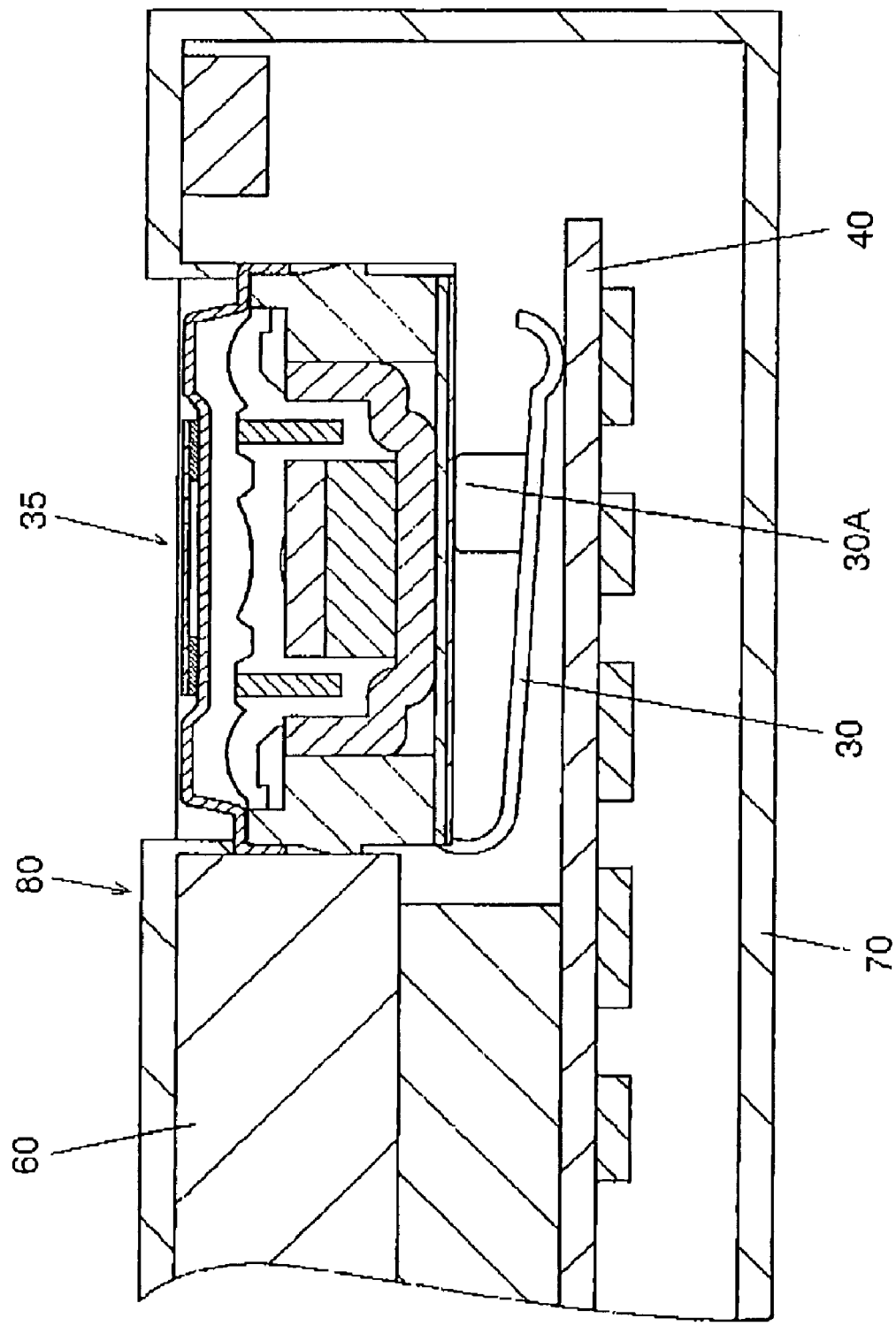
FIG. 11 is a cross-sectional view of a main part illustrating the electronic apparatus shown in FIG. 10 where a terminal is bent.
Figure 12:
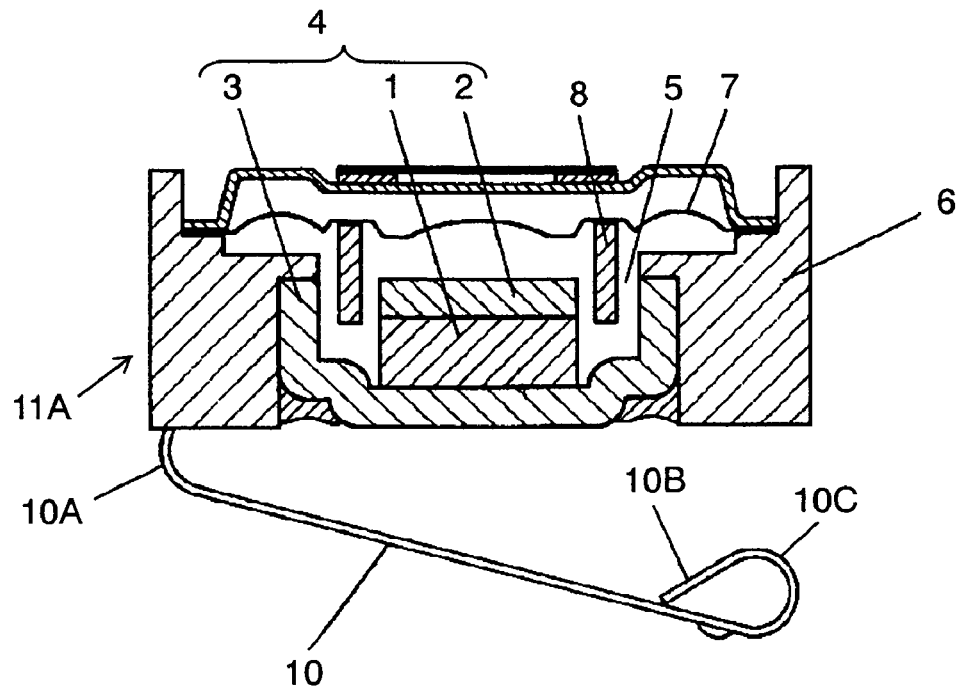
FIG. 12 and FIG. 13 are a cross-sectional view illustrating a conventional loudspeaker.
Figure 13:
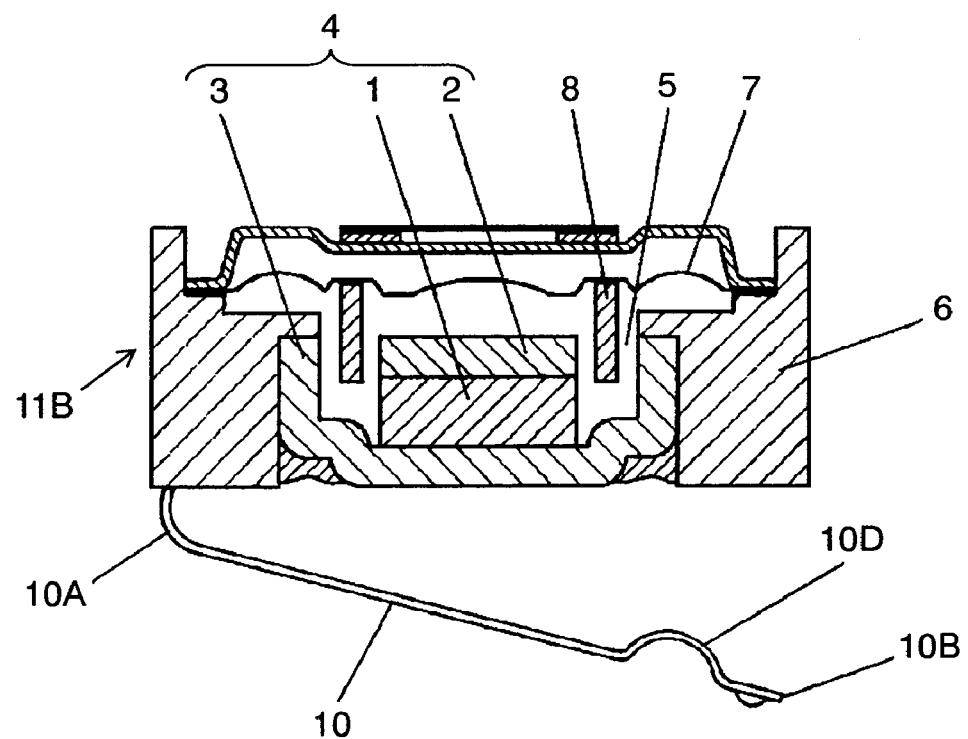

Next, a structure will be described in which loudspeaker 35 having any stopper 30A of the above-described ones is installed in an electronic apparatus. FIGS. 10 and 11 are cross-sectional views of a main part illustrating a portable telephone unit in the exemplary embodiment of the present invention. The portable telephone unit 80 as an electronic apparatus includes loudspeaker 35.

Portable telephone unit 80 has loudspeaker 35, electronic circuit 40, display module 60 such as a liquid crystal panel, and the like. The respective components, modules, and the like are installed in outer package 70 to constitute the main part of portable telephone unit 80. Terminal 30 of loudspeaker 35 is abutted with electronic circuit 40 at contact point 30E while being applied with a spring pressure and the former is electrically connected to the latter. Loudspeaker 35 emits sound by being driven by electric power supplied from electronic circuit 40.

This structure prevents stopper 30A from being deformed or collapsed even if loudspeaker 35 has a large dimensional margin when loudspeaker 35 is attached to portable telephone unit 80. This structure also prevents stopper 30A from being deformed or collapsed even when portable telephone unit 80 is dropped due to a careless handling and thus an excessive impactive force is applied to terminal 30. Specifically, this structure prevents terminal 30 from being bent to a level exceeding the reversibility limit value of the spring pressure of the metal plate. Thus, terminal 30 is prevented from having a reduced spring pressure.

Thus, terminal 30 can always maintain a strong spring pressure. This provides a stable contact with an electric supply section of electronic circuit 40 of portable telephone unit 80. Furthermore, poor contact is prevented even when portable telephone unit 80 receives an impact or is vibrated. Thus, signal transfer is prevented from being interrupted and is stable. This provides an electronic apparatus such as a portable telephone unit with improved reliability and quality.

INDUSTRIAL APPLICABILITY

The electro-acoustic transducer according to the present invention can be applied to electronic apparatuses which are required to have improved reliability and quality such as an image audio equipment, an information communication apparatus, and a game machine.

The invention claimed is:

1. An electro-acoustic transducer comprising:
   a magnetic circuit;
   a frame joined to the magnetic circuit;
   a diaphragm joined to a circumferential edge of the frame;
   a voice coil joined to the diaphragm and partially provided in a magnetic gap of the magnetic circuit;
   a terminal composed of a metal plate having spring property and conductivity, the terminal being partially fixed to the frame, and electrically connected to the voice coil; and
   a stopper for restricting a bending range of the metal plate constituting the terminal to a level equal to or lower than a reversibility limit value of a metal material constituting the terminal, the stopper provided at an outer periphery of the metal plate of the terminal, and extending from a main section of the terminal to the frame.

2. The electro-acoustic transducer according to claim 1, wherein the stopper extends from the main section of the terminal in a direction substantially perpendicular to the main section of the terminal.

3. The electro-acoustic transducer according to claim 1, wherein the stopper is one of a plurality of stoppers and the terminal includes the plurality of stoppers.

4. The electro-acoustic transducer according to claim 1, wherein the electro-acoustic transducer further includes a reinforced section that extends along a direction substantially perpendicular to at least a part of the stopper.

5. The electro-acoustic transducer according to claim 4, wherein the reinforced section includes a reinforcing rib for reinforcing the stopper.

6. The electro-acoustic transducer according to claim 1, wherein the stopper further includes a reinforcing rib for reinforcing the stopper.

7. An electronic apparatus comprising:
   an electro-acoustic transducer including:
      a magnetic circuit;
      a frame joined to the magnetic circuit;
      a diaphragm joined to a circumferential edge of the frame;
      a voice coil joined to the diaphragm and partially provided in a magnetic gap of the magnetic circuit;
      a terminal composed of a metal plate having spring property and conductivity, the terminal being partially fixed to the frame, and electrically connected to the voice coil; and
      a stopper for restricting a bending range of the metal plate constituting the terminal to a level equal to or lower than a reversibility limit value of a metal material constituting the terminal, the stopper provided at an outer periphery of the metal plate of the terminal, and extending from a main section of the terminal to the frame, and
   an electronic circuit for supplying electric power to the electro-acoustic transducer, the electronic circuit electrically connected to the electro-acoustic transducer via a contact point provided in the terminal.

* * * * *